United States Patent
Garlick et al.

(10) Patent No.: US 10,423,424 B2
(45) Date of Patent: Sep. 24, 2019

(54) REPLICATED STATELESS COPY ENGINE

(71) Applicant: NVIDIA Corporation, Santa Clara, CA (US)

(72) Inventors: Lincoln G. Garlick, Santa Clara, CA (US); Philip Browning Johnson, Campbell, CA (US); Rafal Zboinski, San Jose, CA (US); Jeff Tuckey, Los Gatos, CA (US); Samuel H. Duncan, Arlington, MA (US); Peter C. Mills, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 698 days.

(21) Appl. No.: 13/631,685

(22) Filed: Sep. 28, 2012

(65) Prior Publication Data

US 2014/0095759 A1     Apr. 3, 2014

(51) Int. Cl.
*G06F 9/38*     (2018.01)

(52) U.S. Cl.
CPC ................. *G06F 9/3877* (2013.01)

(58) Field of Classification Search
CPC ....... G06F 13/28; G06F 3/0656; G06F 3/0659
USPC ......................................... 710/5, 22, 52, 308
See application file for complete search history.

(56) References Cited

U.S. PATENT DOCUMENTS

| | | | |
|---|---|---|---|
| 5,349,680 A * | 9/1994 | Fukuoka | G06F 9/463 712/228 |
| 5,367,680 A * | 11/1994 | Flurry | G06F 9/52 345/501 |
| 5,446,726 A * | 8/1995 | Rostoker | G06F 13/128 348/E5.002 |
| 6,418,489 B1 * | 7/2002 | Mason et al. | 710/22 |
| 6,553,377 B1 * | 4/2003 | Eschelbeck | G06F 21/50 |
| 6,882,567 B1 * | 4/2005 | Wong | G11C 11/5628 365/185.03 |
| 7,076,780 B2 * | 7/2006 | Burch, Jr. | G06F 9/54 717/140 |
| 7,797,463 B2 * | 9/2010 | Halleck | G06F 13/385 370/466 |
| 8,819,106 B1 * | 8/2014 | Sirota | G06F 9/485 709/201 |
| 9,186,793 B1 * | 11/2015 | Meier | B25J 9/1694 |
| 9,658,877 B2 * | 5/2017 | Barwick | G06F 9/461 |
| 2003/0229814 A1 * | 12/2003 | Garnett | G06F 9/4411 713/322 |

(Continued)

*Primary Examiner* — Faisal M Zaman

(74) *Attorney, Agent, or Firm* — Artegis Law Group, LLP

(57) ABSTRACT

Techniques are disclosed for performing an auxiliary operation via a compute engine associated with a host computing device. The method includes determining that the auxiliary operation is directed to the compute engine, and determining that the auxiliary operation is associated with a first context comprising a first set of state parameters. The method further includes determining a first subset of state parameters related to the auxiliary operation based on the first set of state parameters. The method further includes transmitting the first subset of state parameters to the compute engine, and transmitting the auxiliary operation to the compute engine. One advantage of the disclosed technique is that surface area and power consumption are reduced within the processor by utilizing copy engines that have no context switching capability.

24 Claims, 6 Drawing Sheets

(56) References Cited

U.S. PATENT DOCUMENTS

| | | | |
|---|---|---|---|
| 2004/0008360 A1* | 1/2004 | Ankrum | B41J 2/17503 358/1.13 |
| 2004/0034746 A1* | 2/2004 | Horn | G06F 12/0866 711/141 |
| 2004/0160446 A1* | 8/2004 | Gosalia et al. | 345/503 |
| 2005/0068581 A1* | 3/2005 | Hull | G06F 3/1206 358/1.16 |
| 2005/0166039 A1* | 7/2005 | Wang | G06F 9/3009 712/227 |
| 2005/0257221 A1* | 11/2005 | Inchingolo | G06Q 10/06 718/100 |
| 2006/0168086 A1* | 7/2006 | Kagan | G06F 9/546 709/207 |
| 2006/0206635 A1* | 9/2006 | Alexander et al. | 710/22 |
| 2007/0162640 A1* | 7/2007 | Johns et al. | 710/22 |
| 2007/0234091 A1* | 10/2007 | Vishin | G06F 1/3203 713/322 |
| 2008/0320267 A1* | 12/2008 | Bilger | G06F 13/1694 711/170 |
| 2009/0287857 A1* | 11/2009 | Vu | 710/22 |
| 2010/0020825 A1* | 1/2010 | Bass | H04L 69/04 370/477 |
| 2010/0185812 A1* | 7/2010 | Kim | G06F 12/0868 711/109 |
| 2011/0038195 A1* | 2/2011 | Hamilton | B82Y 10/00 365/148 |
| 2011/0047335 A1* | 2/2011 | Kumura | G06F 9/52 711/143 |
| 2011/0320724 A1* | 12/2011 | Mejdrich et al. | 711/125 |
| 2012/0047516 A1* | 2/2012 | Barwick | G06F 9/461 718/108 |
| 2012/0254114 A1* | 10/2012 | Gundy | G06F 17/30088 707/639 |
| 2014/0006668 A1* | 1/2014 | Chew | G06F 13/24 710/269 |
| 2014/0052943 A1* | 2/2014 | Golliver | G06F 9/526 711/154 |
| 2014/0089348 A1* | 3/2014 | Vollmert | G06F 17/30699 707/785 |

* cited by examiner

REPLICATED STATELESS COPY ENGINE

BACKGROUND OF THE INVENTION

Field of the Invention

The present invention generally relates to memory copy operations in a computing environment, and, more particularly, to replicated stateless copy engines.

Description of the Related Art

In some compute environments, memory copy operations are efficiently performed by dedicated units known as copy engines (CEs). A host central processing unit (CPU) offloads memory copy operations to one or more CEs by sending instructions to the CEs, where the instructions include the address of a source block of memory, and a destination address to where the memory block is copied. In computing applications that involve extensive memory copy operations, performance is increased by delegating memory copy operations to the CEs, leaving the host CPU available to perform other tasks. If a system includes multiple CEs, then the host CPU may program the multiple CEs to enable several memory copy operations to be processed concurrently, further improving performance.

Typically, multiple application programs may be executing in the host CPU simultaneously. In such cases, the multiple application programs may be sending memory copy operations to the same set of CEs. In order to transparently share one or more CEs among multiple application programs, CEs may employ a technique known as context switching. During a context switch, the current context, or state, of the CEs, associated with the current application program, is stored so that the context may be restored at a later time when the current application program resumes execution. A new context, associated with a new application program, is then restored, allowing the new application to begin execution. Context switching enables multiple application programs to share one or more CEs. With context switching, the host CPU informs a CE when a new application program is using the CE and provides the CE with information regarding where the context for the new application program is stored. The CE then finishes any work currently in process, saves the context for the application program currently using the CE, and fetches from memory the context associated with the new application program. Once completed, the CE is then ready to accept memory copy operations associated with the new application context.

One problem with the above approach is that the logic needed to perform context switching is typically large and complex. Further, this context switching logic is not related to the CEs primary function, but rather is dedicated to context switching. CEs that support context switching often have a significant amount of surface area devoted to logic that supports the context switching function. Another problem with the above approach is that the steps to save a current context and load a new context involve reading and writing to a memory subsystem which may have long access times. Typically, saving the current context and loading the new context is performed after the memory copy operation for the new context is ready to begin, resulting in a delay of the memory copy operation. The time to perform context switching leaves less time available for the CEs to accomplish the actual memory copy operation, reducing overall performance.

As the foregoing illustrates, what is needed in the art is an improved approach for performing memory copy operations in a compute environment.

SUMMARY OF THE INVENTION

One embodiment of the present invention sets forth a method for performing an auxiliary operation via a compute engine associated with a host computing device. The method includes determining that the auxiliary operation is directed to the compute engine, and determining that the auxiliary operation is associated with a first context comprising a first set of state parameters. The method further includes determining a first subset of state parameters related to the auxiliary operation based on the first set of state parameters. The method further includes transmitting the first subset of state parameters to the compute engine, and transmitting the auxiliary operation to the compute engine.

Other embodiments include, without limitation, a subsystem that includes a copy engine configured to implement one or more aspects of the disclosed methods as well as a computing device configured to implement one or more aspects of the disclosed methods.

One advantage of the disclosed technique is that surface area and power consumption are reduced within the processor by utilizing copy engines that have no context switching capability. Because the logic needed to support context switching is complex, copy engines lacking context switching are smaller and simpler than those copy engines that do support this feature.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
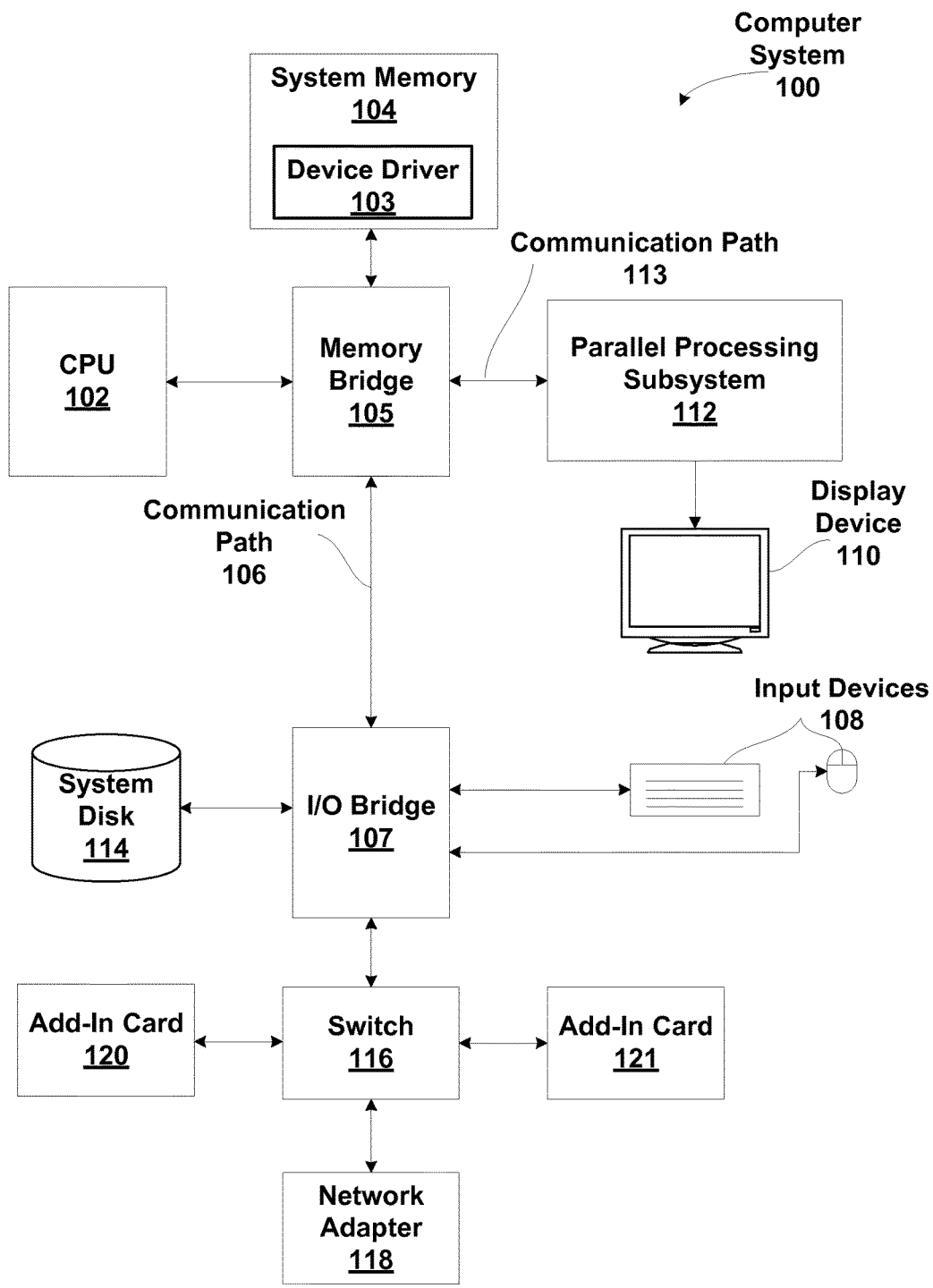
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
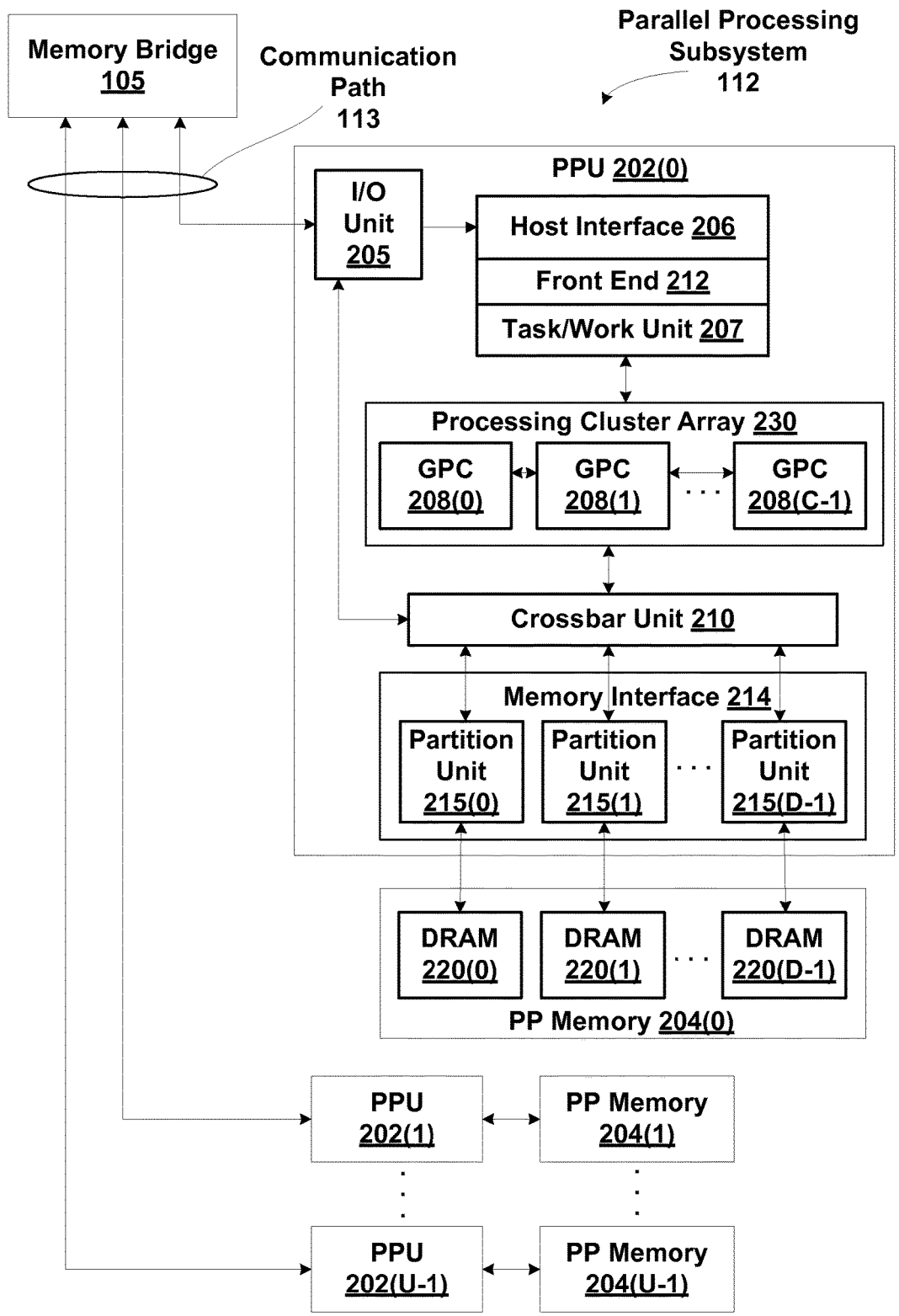
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task resumes at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

It will be appreciated that the core architecture described herein is illustrative and that variations and modifications are possible. A PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, and L1 caches to execute tasks for one or more application programs.

Figure 3:
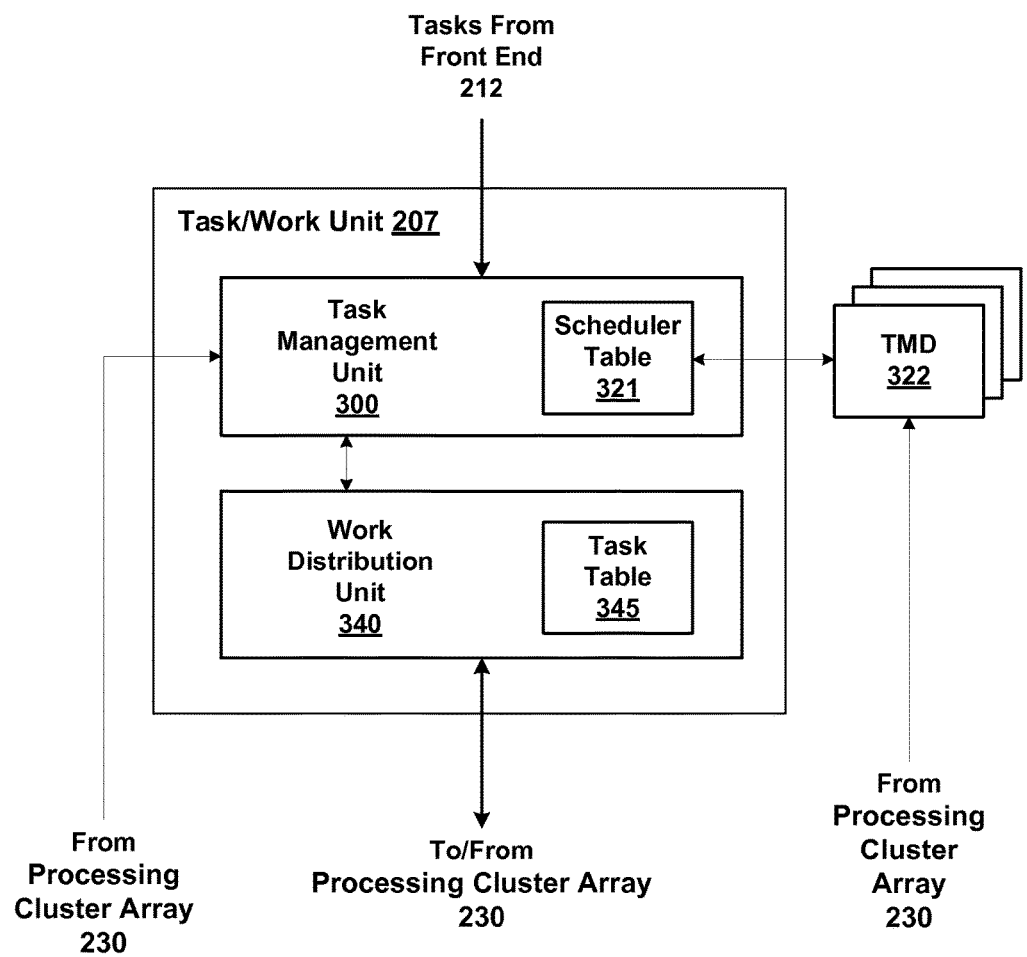
FIG. 3 is a block diagram of a general processing cluster within one of the parallel processing units of FIG. 2, according to one embodiment of the present invention.

Persons of ordinary skill in the art will understand that the architecture described in FIGS. 1, 2, and 3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines available, and m is the number of thread groups simultaneously active. The size of a CTA is generally determined by the programmer and the amount of hardware resources, such as memory or registers, available to the CTA. A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. A CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Stateless Copy Engines

Figure 4:
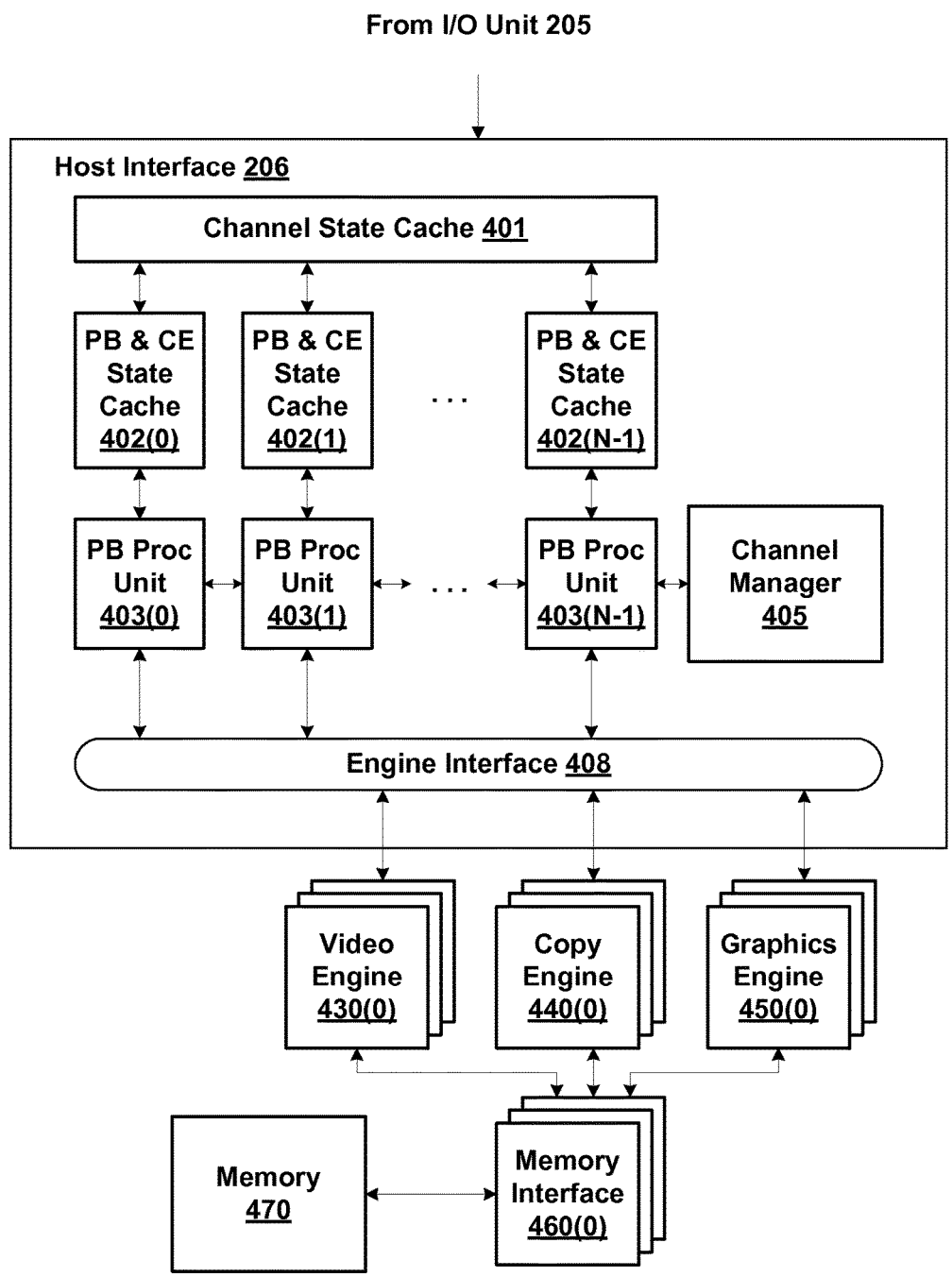
FIG. 4 illustrates the host interface of FIG. 2 and associated engines, according to one embodiment of the present invention.

FIG. 4 illustrates the host interface 206 of FIG. 2 and associated compute engines, according to one embodiment of the present invention. As shown, the host interface 206 includes a channel state cache 401, a channel manager 405, pushbuffer and copy engine state caches 402, pushbuffer processing units 403, and an engine interface 408.

The channel state cache 401 is a storage area that includes the context for a plurality of channels. When a new application program is launched that needs a new context within the host, a channel within the channel state cache 401 is assigned to the new application program. The context for the new application program is configured by the host and stored in a corresponding channel within the channel state cache 401. As further described below, when an application program is selected for execution, the context stored in the corresponding channel within the channel state cache 401 is transferred to a pushbuffer and copy engine state cache 402. The context stored within a channel of the channel state cache 401 includes at least pushbuffer state parameters and copy engine state parameters. In one embodiment, the channel state cache 401 is not stored within the host interface logic 206, but rather is stored in a separate memory (not shown) that is accessible to the host interface logic 206. Channels are assigned by the channel manager 405.

The channel manager 405 assigns channels to various application programs and selects pushbuffer processing units 403 to execute instructions for a particular application program. When a new application is created, the channel manager 405 selects an available channel within the channel state cache 401 and stores the context for the new application program in the selected channel. When an application is selected for execution, the channel manager 405 selects one or more pushbuffer processing units 403 to execute instructions on behalf of the application program. The channel manager 405 then transfers the context for the selected application program from the corresponding channel of the channel state cache 401 to the pushbuffer and copy engine state caches 402 corresponding to the selected pushbuffer processing units 403. When an application program terminates, the channel manager de-assigns the corresponding channels in the channel state cache 401, freeing the channels for assignment to another application program.

The pushbuffer and copy engine state caches 402 store the pushbuffer state parameters and the copy engine state parameters for the pushbuffer processing unit 403 and the copy engine 440 selected to execute instructions associated with the current application program. After an application program is selected for execution, a pushbuffer processing unit 403 is selected to execute instructions associated with the selected application program. The context for the selected application program is transferred from the corresponding channel within the channel state cache 401 to the pushbuffer and copy engine state cache 402 corresponding to the selected pushbuffer processing unit 403. The pushbuffer state parameters include information needed by the pushbuffer processing unit 403 for proper execution of instruction for the application program. As further described below, the copy engine state parameters are transferred from the pushbuffer processing unit 403 to one or more copy engines 440 along with memory copy operations. The copy engine state parameters include information needed by the copy engine 440 for proper execution of memory copy operations related to the application program. As shown, there are N pushbuffer and copy engine state caches 402(0) 402(N−1) corresponding to N pushbuffer processing units 403(0)-403(N−1).

The pushbuffer processing units 403(0)-403(N−1) are computational units that process instructions on behalf of an application program. The pushbuffer processing unit 403 may need one or more parameters from the pushbuffer state parameters in order to process an instruction. The pushbuffer processing unit 403 retrieves these pushbuffer state parameters from the pushbuffer and copy engine state cache 402 corresponding to the pushbuffer processing unit 403.

During program execution, a pushbuffer processing unit 403 may send certain commands to one or more compute engines optimized to perform specific types of operations. For example, the compute engines could include one or more video engines 430 to perform operations specific to video images, including, without limitation, format conversion, video encoding and decoding, video compression and decompression, and video scaling. In another example, the compute engines could include one or more copy engines 440 to perform memory copy operations such as transferring blocks of memory from one location to another. In yet another example, the compute engines could include one or more graphics engines 450 to perform operations specific to graphics objects, including, without limitation, computing lighting parameters, rasterizing geometric primitives into pixel fragments, and shading pixels. Video engines 430, copy engines 440, and graphics engines 450 may access a shared memory 470 during the execution of various operations that the compute engines receive from the pushbuffer processing units 403. The compute engines access the memory 470 via a memory interface 460 assigned to each compute engine, where the memory interface 460 includes memory bindings that map the memory address space of a given compute engine to the memory address space of the shared memory 470. The pushbuffer processing units 403 access the compute engines via an engine interface 408. In one embodiment, the host interface 206 may also include an application scheduling unit (not shown) that schedules applications, as well as associated threads and channels, by selecting which pushbuffer processing unit accesses a given compute engine at a given time. In this manner, multiple pushbuffer processing units may share the same set of compute engines.

The engine interface 408 is a link between the pushbuffer processing units 403 and the video engines 430, copy engines 440, and graphics engines 450. The engine interface 408 acts as a crossbar switch to connect pushbuffer processing units 403 to one or more compute engines as needed. If a pushbuffer processing unit 403 executes an instruction where one of the compute engines is selected to perform an operation, then the engine interface 408 connects the pushbuffer processing unit 403 to an available compute engine of the appropriate type. The pushbuffer processing unit 403 then sends one or more operations for the compute engine to complete. When the compute engine has completed the operations, the engine interface 408 disconnects the pushbuffer processing unit 403 from the compute engine.

Figure 5:
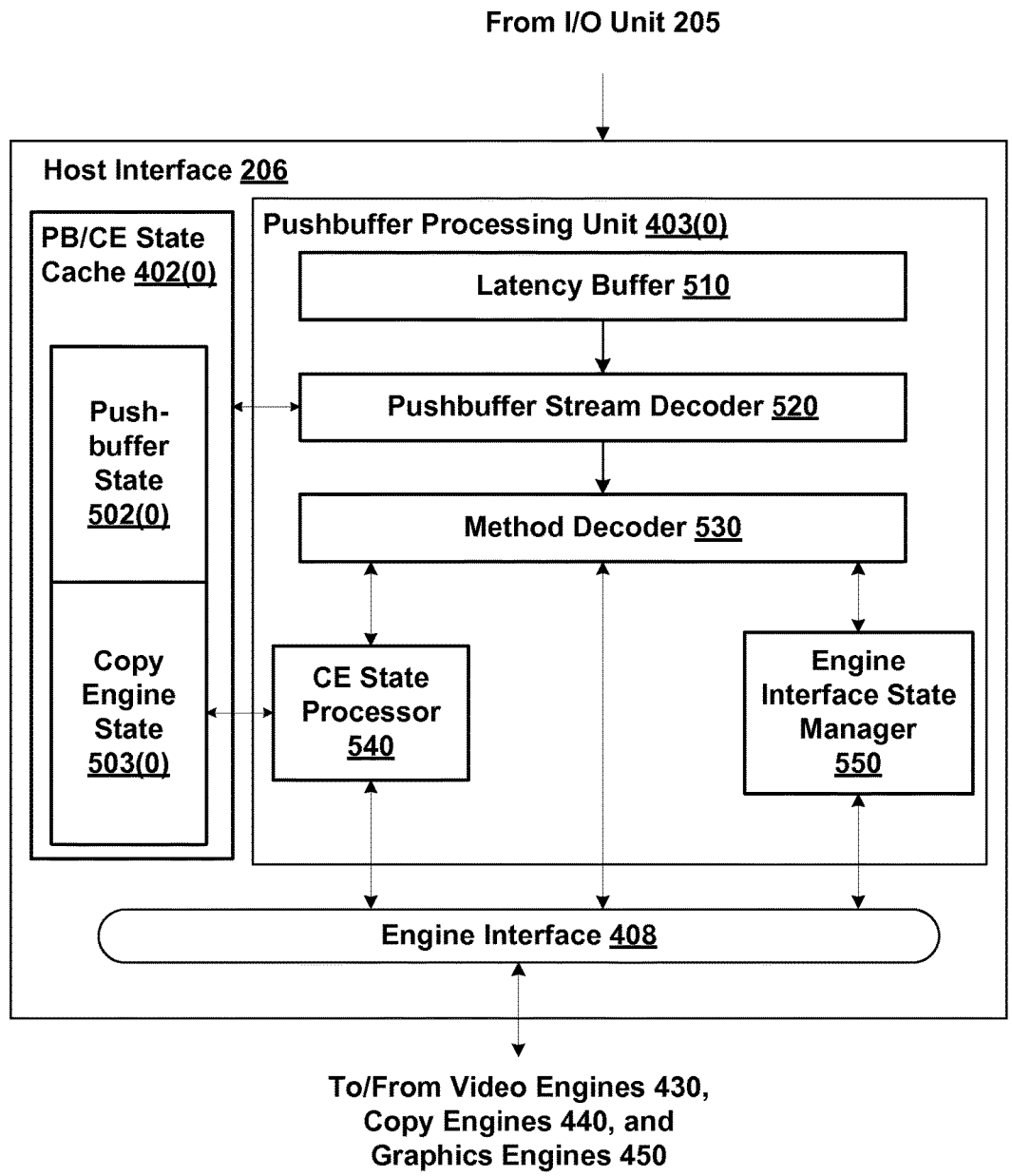
FIG. 5 illustrates a pushbuffer processing unit within the host interface of FIG. 4, according to one embodiment of the present invention.

FIG. 5 illustrates a pushbuffer processing unit 403 within the host interface 206 of FIG. 4, according to one embodiment of the present invention. The pushbuffer processing unit 403 includes a latency buffer 510, a pushbuffer stream decoder 520, a method decoder 530, a copy engine state processor 540, and an engine interface state manager 550. Also illustrated are the pushbuffer and copy engine state cache 402(0) and the engine interface 408, which operate substantially the same as described in conjunction with FIG. 4, except as further described below.

The latency buffer 510 is a storage buffer configured to store operations as the operations are received from the I/O unit 205. The latency buffer 510 stores the operations until the pushbuffer stream decoder 520 is ready to retrieve and process the operations. The latency buffer 510 compensates for transient differences in arrival rate of operations received from the I/O unit 205 and the processing throughput of the pushbuffer stream decoder 520. In one embodiment, the size of the latency buffer 520 may be determined by balancing the difference in operation arrival rate to pushbuffer stream decoder 520 throughput versus the latency of operations buffered within the latency buffer 520. If the size of the latency buffer 520 is too low, then the latency buffer 520 may become full or empty, resulting in reduced throughput performance. If the size of the latency buffer 520 is too high, then the latency of an operation passing through the pushbuffer processing unit 403(0) may be unacceptably high. The latency buffer 510 transmits stored operations to the pushbuffer stream decoder 520 when the pushbuffer stream decoder 520 is ready to process additional operations.

The pushbuffer stream decoder 520 is a processing unit that retrieves and processes a stream of operations retrieved from the latency buffer 520. The operations retrieved from latency buffer 520 include, without limitation, operations to load a new context into the pushbuffer and copy engine state cache 402(0), and operations directed for execution by a compute engine. These compute engines include, without limitation, the video engines 430, copy engines 440, and graphics engines 450, as described in conjunction with FIG. 4. If the retrieved operation is an operation to load a new context associated with a given channel, then the pushbuffer stream decoder 520 retrieves the new context for the associated channel from the channel state cache 401. The pushbuffer stream decoder 520 stores the new context in the pushbuffer and copy engine state cache 402(0). The new context includes, without limitation, a pushbuffer state 502(0) comprising state parameters used by the pushbuffer stream decoder 520, and a copy engine state 503(0) comprising state parameters used by the copy engine state processor 540. If the retrieved operation is directed for execution by a compute engine, then the pushbuffer processing unit 403 transmits the operation to the method decoder 530. Such an operation may be identified as an auxiliary operation or as a method.

The method decoder 530 processes auxiliary operations or methods received from the pushbuffer stream decoder 520. The method decoder 520 directs certain methods to one of the compute engines, such as a video engine 430, a copy engine 440, or a graphics engine 450. In one embodiment, the method decoder 520 may direct a method to a specific compute engine by decoding a sub-field within the method. The subfield may identify the type of compute engine, as well as a specific compute engine of a given type. If the compute engine is a copy engine, then the method decoder transmits the method to the copy engine state processor 540. If the compute engine is not a copy engine, then the method transmits the method to the engine interface 408. The engine interface 408 then transmits the method to the specific compute engine.

The copy engine state processor 540 receives methods associated with one of the copy engines 440 from the method decoder 530. The methods include, without limitation, parameter methods and action methods.

If the method received from the method decoder 530 is a parameter method, then the copy engine state processor 540 updates a state parameter in the copy engine state 503(0). The parameter method identifies the specific state parameter to update and the new value of the state parameter. In one embodiment, the copy engine state processor 540 does not transmit any methods to the engine interface 108 when processing a parameter method.

If the method received from the method decoder 530 is an action method, then the copy engine state processor 540 retrieves a subset of the state parameters stored in the copy engine state 503(0), where the subset of state parameters is associated with the action method. The copy engine state processor 540 transmits the subset of state parameters to the engine interface 408. In one embodiment, the copy engine state processor 540 may transmit the entire set of state parameters included in the copy engine state 503(0). In another embodiment, the copy engine state processor 540 may transmit only those state parameters needed to execute the current action method. The copy engine state processor 540 then transmits the action method to the engine interface 408. In one embodiment, the copy engine state processor 540 may transmit the action method to the engine interface 408 prior to transmitting the subset of state parameters. In such a case, the cope engine 440 may determine ahead of time how to decode the subset of state parameters based on the action method received.

In one embodiment, the copy engine state processor 540 may determine whether the copy engine 440 is ready to receive an action method before transmitting the action method to the engine interface 408. The copy engine state processor 540 may determine whether the copy engine 440 is ready by determining whether an operation storage buffer associated with the compute engine has sufficient storage space to store the action method and the associated state parameters. The copy engine state processor 540 may further determine whether the copy engine 440 is ready by determining whether the quantity of outstanding methods associated with the compute engine exceeds a threshold value. If the copy engine 440 is ready to receive the action method, then the copy engine state processor 540 may transmit the action method to the engine interface 408. If the copy engine 440 is not ready to receive the action method, then the copy engine state processor 540 may wait for the copy engine 440 to be ready before transmitting the action method to the engine interface 408.

In one embodiment, the copy engine state processor 540 may send memory bind methods to the engine interface, where a memory bind method may cause new page tables to be loaded in the memory interface 460. When a new context is loaded, new memory bindings may need to be transmitted to the copy engine 440. The copy engine 440 may then update the page tables in the memory interface 460. Subsequent action methods, associated with the new context, may then access the memory 470 according to the updated memory bindings. The copy engine state processor 540 may send a memory bind method to the engine interface whether or not the memory bindings have changed. In such a case, the copy engine 440 may discard memory bind methods that unless the memory bindings are different than those currently loaded in the memory interface 460. In another embodiment, the copy engine state processor 540 may send a memory bind method to the engine interface only when the memory bindings change as a result of a new context being loaded. In one embodiment, the copy engine state processor 540 may wait for the copy engine 440 to be in an idle state prior to sending a new memory bind method. In another embodiment, the copy engine state processor 540 may not wait for the copy engine 440 to be in an idle state prior to sending a new memory bind method. In the latter case, the copy engine may wait to process a new memory bind method until prior operations have completed execution.

In one embodiment, the copy engine state processor 540 may process parameter methods when the associated copy engine 440 is in a power management mode. A power management mode may be any technically feasible approach to reduce power consumption of the compute engine during times when the compute engine is not processing methods, including, without limitation, reducing power applied to the compute engine, removing power from the compute engine, or placing the compute engine in a hibernation state. In another embodiment, the copy engine state processor 540 may determine whether the associated copy engine 440 is in a power management mode before transmitting an action method. If the copy engine 440 is in a power management mode, then the copy engine state processor 540 may cause full power to be applied to the copy engine 440, causing the copy engine 440 to exit from the power management mode. When the copy engine 440 is fully powered and no longer in the power management mode, the copy engine state processor 540 may then transmit the action method. In yet another embodiment, the copy engine state processor 540 may determine that an action method is identified as a conditional method. If a condition associated with such a conditional method is true, then the copy engine state processor 540 may cause full power to be applied to the copy engine 440 and transmit the action method. If the condition associated with the conditional method is false, then the copy engine state processor 540 may leave the copy engine 440 in a power management mode and discard the action method.

The method decoder sends action methods and memory bind methods to the engine interface 408. The engine interface 408 then sends the methods to the copy engine 440.

The engine interface state manager 550 monitors methods transmitted by the method decoder 530, and synchronizes the processing of methods based on certain conditions. If the engine interface state manager 550 determines that a current method is directed to a different compute engine than a prior method, then the engine interface state manager 550 sends a hold signal to the method decoder 530, where the hold signal prevents the method decoder 530 from transmitting additional methods. The engine interface state manager 550 also transmits a request signal to the engine interface 408, where the request signal identifies the compute engine that is processing the prior method. The engine interface 408 waits for the designated compute engine to be in an idle state, where the idle state indicates that the compute engine has completed all outstanding methods. The engine interface then transmits an acknowledgement signal to the engine interface state manager 550. The engine interface state manager 550 then releases the hold signal, allowing the method decoder 530 to resume sending methods.

If the engine interface state manager 550 determines that a current method is directed to the same compute engine as a prior method, but to a new context, then the engine interface state manager 550 sends a hold signal to the method decoder 530, where the hold signal prevents the method decoder 530 from transmitting additional methods. In one embodiment, the engine interface state manager 550 may determine that a current method is directed to a new context by monitoring memory bind methods transmitted by the method decoder 530. If the memory bind method indicates a new page table mapping from the previous memory bind method, then the engine interface state manager 550 may conclude that the next action method is associated with a new context. The engine interface state manager 550 may also transmit a request signal to the engine interface 408, where the request signal identifies the compute engine that is processing the prior method. The engine interface 408 may wait for the designated compute engine to be in an idle state, where the idle state indicates that the compute engine has completed all outstanding methods. The engine interface 408 may then transmit an acknowledgement signal to the engine interface state manager 550. The engine interface state manager 550 may then release the hold signal, allowing the method decoder 530 to resume sending methods associated with the new context to the compute engine.

It will be appreciated that the architecture described herein is illustrative only and that variations and modifications are possible. For example, although described herein in the context of copy engines 440, the techniques could be used with other compute engines, including, without limitation, video engines 430 and graphics engines 450. In another example, although described herein in the context of memory copy operations, the techniques could be used for any technically feasible auxiliary operation executed by a compute engine, including, without limitation, format conversion, video encoding and decoding, and shading pixels. In yet another example, the techniques disclosed herein may be employed across any number of compute engines. Various auxiliary operations may be allocated to the various compute engines using any technically feasible approach, including, without limitation, round robin methods, first available methods, random allocation, or a priority-based approach.

Figure 6:
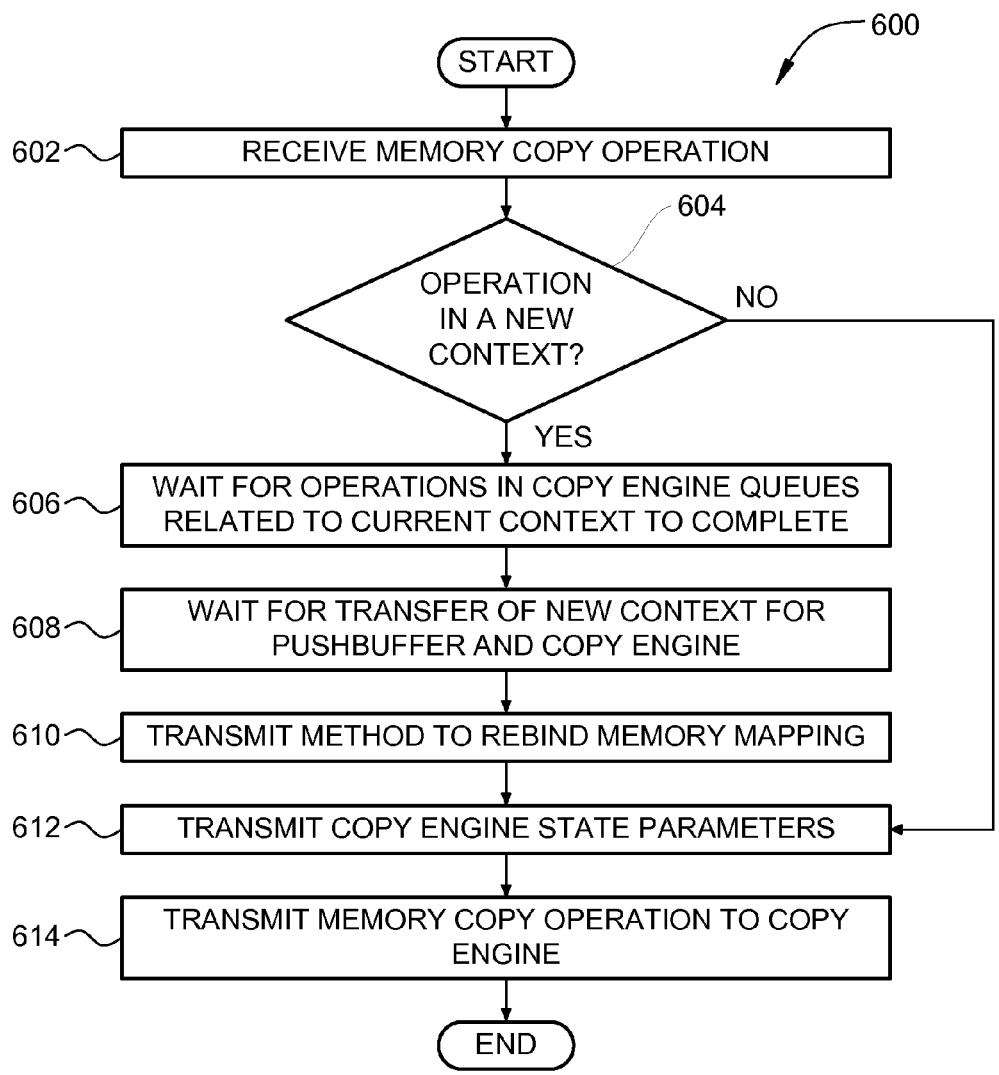
FIG. 6 sets forth a flow diagram of method steps for performing a memory copy operation via a stateless copy engine, according to one embodiment of the present invention.

FIG. 6 sets forth a flow diagram of method steps for performing a memory copy operation via a stateless copy engine, according to one embodiment of the present invention. Although the method steps are described in conjunction with the systems of FIGS. 1-5, persons of ordinary skill in the art will understand that any system configured to perform the method steps, in any order, is within the scope of the present invention.

The method 600 begins at step 602, where the copy engine state processor 540 receives a memory copy operation. At step 604, the copy engine state processor 540 determines whether the memory copy operation is in a new context relative to the context currently loaded in the pushbuffer processing unit 403. If the memory copy operation is in a new context, then the method 600 proceeds to step 608, where the copy engine state processor 540 waits for outstanding operations within the queues of the copy engine to complete, where the outstanding operations are related to the current context. At step 608, the copy engine state processor 540 waits for the new context for the pushbuffer and copy engine to be transferred from the channel state cache 401 to the pushbuffer and copy engine state cache 402. At step 610, the copy engine state processor 540 transmits a method to the copy engine 440, via the engine interface 408, to rebind the memory mapping in the memory interface 460 to the mapping appropriate to the new context. At step 612, the copy engine state processor 540 transmits the copy engine state parameters needed for the memory copy operation to the copy engine 440 via the engine interface 408. At step 614, the copy engine state processor 540 transmits the memory copy operation to the copy engine 440 via the engine interface 408. The method 600, then terminates.

If, however, at step 604, the memory copy operation is not in a new context relative to the context currently loaded in the pushbuffer processing unit 403, then the method 600 proceeds to step 612, described above.

In sum, a host CPU is configured to transmit memory copy operations to one or more CEs, where the host CPU transmits the relevant context to the CE along with the memory copy operation. The host CPU updates state parameters associated with the current CE context by updating memory that is local to the host CPU, rather than sending the state parameter updates to the CE. When the host CPU receives an action direct to the CE, such as an action to launch a memory copy operation, the host CPU first transmits the relevant state parameters from the current CE context, followed by the action. When the host CPU switches context for a CE, the host CPU first waits for the CE to complete queued tasks associated with the current context. The host CPU then sends a command to the CE directing the CE to rebind memory address space to the new context, and then sends state parameters and actions associated with the new context.

One advantage of the disclosed approach is that surface area and power consumption are reduced within the processor by utilizing copy engines that have no context switching capability. Because the logic needed to support context switching is complex, copy engines lacking context switching are smaller and simpler than those copy engines that do support this feature.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for performing a first memory copy operation via a compute engine associated with a host computing device, the method comprising:
   assigning each application program included in a plurality of application programs to a different channel included in a plurality of channels, wherein the plurality of channels are included in a cache;
   storing a first subset of state parameters in a first channel included in the plurality of channels, wherein the first subset of state parameters is associated with a first application program;
   storing a second subset of state parameters in a second channel included in the plurality of channels, wherein the second subset of state parameters is associated with a second application program;
   determining that the first memory copy operation is directed to the compute engine;
   determining that the first memory copy operation is associated with a first context comprising a first set of state parameters;
   selecting, from the plurality of channels, the first channel having stored therein the first subset of state parameters to be implemented by the compute engine to execute the first memory copy operation, wherein each channel included in the plurality of channels has stored therein a different subset of state parameters from the first set of state parameters;
   transmitting the first subset of state parameters to the compute engine;
   transmitting the first memory copy operation to the compute engine, wherein the compute engine executes the first memory copy operation according to the first subset of state parameters; and
   in response to determining that the first application has terminated, de-assigning the first application from the first channel.

2. The method of claim 1, wherein the compute engine comprises a copy engine.

3. The method of claim 1, further comprising transmitting an operation to the compute engine that causes the compute engine to configure a plurality of page tables in a memory management unit that is associated with the compute engine.

4. The method of claim 1, further comprising:
   determining that a second memory copy operation is directed to the compute engine;
   determining that the second memory copy operation is associated with the first context;
   determining, based on the first set of state parameters, a third subset of state parameters to be implemented by the compute engine to execute the second memory copy operation;
   transmitting the third subset of state parameters to the compute engine; and
   transmitting the second memory copy operation to the compute engine.

5. The method of claim 4, further comprising determining that an operation storage buffer associated with compute engine has available space sufficient to store the second memory copy operation and the third subset of state parameters.

6. The method of claim 5, further comprising determining that a number of outstanding memory copy operations stored in the operation storage buffer does not exceed a threshold value.

7. The method of claim 1, further comprising:
   determining that a second memory copy operation is directed to the compute engine;
   determining that the second memory copy operation is associated with a second context comprising a second set of state parameters;
   waiting for the compute engine to complete the first memory copy operation;
   determining, based on the second set of state parameters, a third subset of state parameters to be implemented by the compute engine to execute the second memory copy operation;
   transmitting the third subset of state parameters to the compute engine; and
   transmitting the second memory copy operation to the compute engine.

8. The method of claim 1, further comprising:
   determining that a second memory copy operation is configured to change a state parameter within the first set of state parameters from a first value to a second value; and
   updating the state parameter from the first value to the second value.

9. The method of claim 8, wherein the step of updating the state parameter occurs while the compute engine is in a power management mode.

10. The method of claim 1, further comprising causing power to be applied to the compute engine.

11. The method of claim 1, wherein the first subset of state parameters comprises all state parameters within the first set of state parameters.

12. A subsystem, comprising:
   a compute engine state processor configured to perform a first memory copy operation via a compute engine associated with a host computing device by performing the steps of:
      assigning each application program included in a plurality of application programs to a different channel included in a plurality of channels, wherein the plurality of channels are included in a cache;
      storing a first subset of state parameters in a first channel included in the plurality of channels, wherein the first subset of state parameters is associated with a first application program;
      storing a second subset of state parameters in a second channel included in the plurality of channels, wherein the second subset of state parameters is associated with a second application program;

determining that the first memory copy operation is directed to the compute engine;

determining that the first memory copy operation is associated with a first context comprising a first set of state parameters;

selecting, from the plurality of channels, the first channel having stored therein the first subset of state parameters to be implemented by the compute engine to execute the first memory copy operation, wherein each channel included in the plurality of channels has stored therein a different subset of state parameters from the first set of state parameters;

transmitting the first subset of state parameters to the compute engine;

transmitting the first memory copy operation to the compute engine, wherein the compute engine executes the first memory copy operation according to the first subset of state parameters; and in response to determining that the first application has terminated, de-assigning the first application from the first channel.

13. The subsystem of claim 12, wherein the compute engine comprises a copy engine.

14. The subsystem of claim 12, wherein the compute engine state processor is further configured to perform the step of transmitting an operation to the compute engine that causes the compute engine to configure a plurality of page tables in a memory management unit that is associated with the compute engine.

15. The subsystem of claim 12, wherein the compute engine state processor is further configured to perform the steps of:

determining that a second memory copy operation is directed to the compute engine;

determining that the second memory copy operation is associated with the first context;

determining, based on the first set of state parameters, a third subset of state parameters to be implemented by the compute engine to execute the second memory copy operation;

transmitting the third subset of state parameters to the compute engine; and transmitting the second memory copy operation to the compute engine.

16. The subsystem of claim 15, wherein the compute engine state processor is further configured to perform the step of determining that an operation storage buffer associated with compute engine has available space sufficient to store the second memory copy operation and the third subset of state parameters.

17. The subsystem of claim 16, wherein the compute engine state processor is further configured to perform the step of determining that a number of outstanding memory copy operations stored in the operation storage buffer does not exceed a threshold value.

18. The subsystem of claim 12, wherein the compute engine state processor is further configured to perform the steps of:

determining that a second memory copy operation is directed to the compute engine;

determining that the second memory copy operation is associated with a second context comprising a second set of state parameters;

waiting for the compute engine to complete the first memory copy operation;

determining, based on the second set of state parameters, a third subset of state parameters to be implemented by the compute engine to execute the second memory copy operation;

transmitting the third subset of state parameters to the compute engine; and transmitting the second memory copy operation to the compute engine.

19. The subsystem of claim 12, wherein the compute engine state processor is further configured to perform the steps of:

determining that a second memory copy operation is configured to change a state parameter within the first set of state parameters from a first value to a second value; and updating the state parameter from the first value to the second value.

20. A computing device, comprising:

a subsystem for performing a first memory copy operation via a compute engine associated with a host computing device, comprising a compute engine state processor configured to perform the steps of:

storing a first subset of state parameters in a first channel included in the plurality of channels, wherein the first subset of state parameters is associated with a first application program;

storing a second subset of state parameters in a second channel included in the plurality of channels, wherein the second subset of state parameters is associated with a second application program;

determining that the first memory copy operation is directed to the compute engine;

determining that the first memory copy operation is associated with a first context comprising a first set of state parameters;

selecting, from the plurality of channels, the first channel having stored therein the first subset of state parameters to be implemented by the compute engine to execute the first memory copy operation, wherein each channel included in the plurality of channels has stored therein a different subset of state parameters from the first set of state parameters;

transmitting the first subset of state parameters to the compute engine;

transmitting the first memory copy operation to the compute engine, wherein the compute engine executes the first memory copy operation according to the first subset of state parameters; and in response to determining that the first application has terminated, de-assigning the first application from the first channel.

21. The subsystem of claim 13, wherein the copy engine is configured to execute the memory copy operation by modifying one or more memory bindings based on the first subset of state parameters.

22. The method of claim 1, wherein the compute engine receives the first context from a central processing unit (CPU).

23. The method of claim 22, wherein the compute engine is included in a parallel processing unit (PPU).

24. The method of claim 1, wherein each channel included in the plurality of channels is associated with a different application, and the first channel is selected from the plurality of channels in response to determining that a first application that corresponds to the first memory copy operation has been selected for execution.

\* \* \* \* \*